(12) United States Patent
Takeda et al.

(10) Patent No.: US 9,081,242 B2
(45) Date of Patent: Jul. 14, 2015

(54) LIQUID CRYSTAL DISPLAY DEVICE

(75) Inventors: Arihiro Takeda, Saitama-ken (JP); Jin Hirosawa, Saitama-ken (JP)

(73) Assignee: JAPAN DISPLAY INC., Tokyo (JP)

( * ) Notice: Subject to any disclaimer, the term of this patent is extended or adjusted under 35 U.S.C. 154(b) by 339 days.

(21) Appl. No.: 13/562,647

(22) Filed: Jul. 31, 2012

(65) Prior Publication Data

US 2013/0077010 A1   Mar. 28, 2013

(30) Foreign Application Priority Data

Sep. 28, 2011  (JP) .................................. 2011-212373

(51) Int. Cl.
*G02F 1/1343*   (2006.01)
*G02F 1/1362*   (2006.01)

(52) U.S. Cl.
CPC .... *G02F 1/134363* (2013.01); *G02F 1/136213* (2013.01); *G02F 2001/134345* (2013.01); *G02F 2001/134381* (2013.01)

(58) Field of Classification Search
USPC ...................................... 349/139–144, 38–39
See application file for complete search history.

(56) References Cited

U.S. PATENT DOCUMENTS

| | | | |
|---|---|---|---|
| 5,434,690 A * | 7/1995 | Hisatake et al. ................... | 349/8 |
| 5,926,244 A * | 7/1999 | Takeda et al. .................. | 349/139 |
| 6,266,116 B1 | 7/2001 | Ohta et al. | |
| 7,006,185 B2 * | 2/2006 | Kim et al. ...................... | 349/130 |
| 7,495,724 B2 | 2/2009 | Yoshida et al. | |
| 7,499,134 B2 | 3/2009 | Yamada et al. | |
| 7,688,416 B2 | 3/2010 | Fukuoka et al. | |
| 7,924,385 B2 * | 4/2011 | Lee ............................... | 349/141 |
| 7,924,393 B2 | 4/2011 | Fukuoka et al. | |
| 8,058,651 B2 * | 11/2011 | Park et al. ........................ | 257/59 |
| 8,228,474 B2 | 7/2012 | Imakawa et al. | |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 13/405,799, filed Feb. 27, 2012, Hirosawa, et al.

(Continued)

*Primary Examiner* — Hoan C Nguyen
(74) *Attorney, Agent, or Firm* — Oblon, McClelland, Maier & Neustadt, L.L.P.

(57) ABSTRACT

In one embodiment, a liquid crystal display device includes a first substrate and a second substrate. The first substrate includes a first gate line and a second gate line extending in a first direction, respectively. A first source line and a second source line extend in a second direction orthogonally crossing the first direction. A pixel electrode includes a first main pixel electrode in the shape of a belt located on an edge of the first source line and extending in the second direction, and a second main pixel electrode in the shape of a belt located on an edge of the second source line and extending in the second direction. A second substrate includes a main common electrode located between the first main pixel electrode and the second main pixel electrode and extending in the second direction.

14 Claims, 9 Drawing Sheets

(56) References Cited

U.S. PATENT DOCUMENTS

| | | |
|---|---|---|
| 2007/0115234 A1 | 5/2007 | Kim et al. |
| 2007/0200990 A1 | 8/2007 | Hirosawa et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2008/0192160 A1 | 8/2008 | Yoshida et al. |
| 2009/0147201 A1 | 6/2009 | Yoshida et al. |
| 2011/0075083 A1 | 3/2011 | Takeda et al. |
| 2012/0099070 A1 | 4/2012 | Hirosawa et al. |
| 2012/0182501 A1 | 7/2012 | Fukuoka et al. |
| 2012/0182509 A1 | 7/2012 | Takano et al. |
| 2012/0236239 A1 | 9/2012 | Morita et al. |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |

OTHER PUBLICATIONS

U.S. Appl. No. 13/425,779, filed Mar. 21, 2012, Takano, et al.
U.S. Appl. No. 13/429,628, filed Mar. 26, 2012, Fujiyama, et al.
U.S. Appl. No. 13/449,871, filed Apr. 18, 2012, Hasegawa, et al.
U.S. Appl. No. 13/469,458, filed May 11, 2012, Takeda, et al.
U.S. Appl. No. 13/470,578, filed May 14, 2012, Takeda, et al.
U.S. Appl. No. 13/471,942, filed May 15, 2012, Kozuka, et al.
U.S. Appl. No. 13/546,655, filed Jul. 11, 2012, Takano, et al.
U.S. Appl. No. 13/542,049, filed Jul. 5, 2012, Takeda, et al.
U.S. Appl. No. 13/553,228, filed Jul. 19, 2012, Fukuoka , et al.
U.S. Appl. No. 13/564,058, filed Aug. 1, 2012, Fujiyama, et al.

* cited by examiner

LIQUID CRYSTAL DISPLAY DEVICE

CROSS-REFERENCE TO RELATED APPLICATION

This application is based upon and claims the benefit of priority from prior Japanese Patent Application No. 2011-212373, filed Sep. 28, 2011, the entire contents of which are incorporated herein by reference.

FIELD

Embodiments described herein relate generally to a liquid crystal display device.

BACKGROUND

In recent years, a flat panel display is developed briskly. Especially, the liquid crystal display device gets a lot of attention from advantages, such as light weight, thin shape, and low power consumption. In an active matrix type liquid crystal display device equipped with a switching element in each pixel, a structure using lateral electric field, such as IPS (In-Plane Switching) mode and FFS (Fringe Field Switching) mode, attracts attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
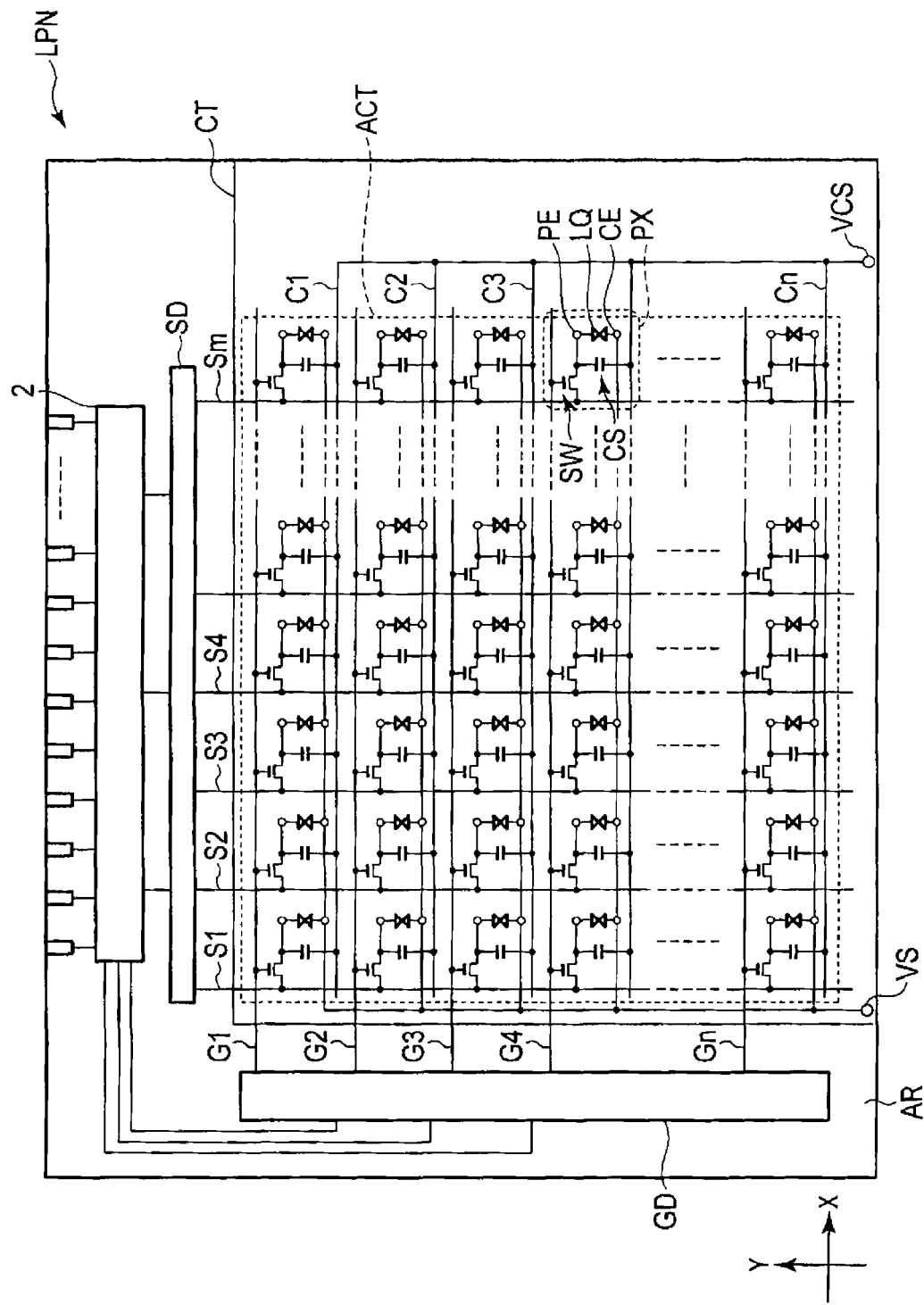
FIG. 1 is a figure schematically showing a structure and the equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a first gate line and a second gate line extending in a first direction, respectively, an auxiliary capacitance line arranged between the first gate line and the second gate line and extending in the first direction, a first source line and a second source line extending in a second direction orthogonally crossing the first direction, a switching element connected with the first gate line and the first source line, a pixel electrode having a first main pixel electrode in the shape of a belt located on an edge of the first source line and extending in the second direction, a second main pixel electrode in the shape of a belt located on an edge of the second source line and extending in the second direction, and a first sub-pixel electrode located on the auxiliary capacitance line and connected with the switching element, wherein the first sub-pixel electrode is formed in the shape of a belt, connects the first main pixel electrode with the second main pixel electrode, and extends in the first direction, a second substrate including; a first main common electrode located between the first main electrode and the second main pixel electrode and extending in the second direction, a second main common electrode arranged above the first source line and extending in the second direction, and a third main common electrode arranged on the second source line and extending in the second direction, and a liquid crystal layer held between the first substrate and the second substrate having liquid crystal molecules.

According to other embodiment, a liquid crystal display device includes: a first substrate including; a gate line extending in a first direction, a source line extending in a second direction orthogonally crossing the first direction, and a first pixel electrode having a first main pixel electrode in the shape of a belt located on an edge of the source line and extending in the second direction, a second pixel electrode having a second main pixel electrode in the shape of a belt located on the other edge of the source line and extending in the second direction, the first main pixel electrode adjoining and being apart from the second main pixel electrode in the first direction, a second substrate including; a first main common electrode and a second main common electrode located on both sides sandwiching the first and second main pixel electrode and extending in the second direction, and a third main common electrode located above the source line and extending in the second direction, and a liquid crystal layer held between the first substrate and the second substrate having liquid crystal molecules.

FIG. 1 is a figure schematically showing a structure and the equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, a liquid crystal layer held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C correspond to signal lines extending in a first direction, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source lines S do not necessarily extend linearly, and a portion thereof may be crooked partially.

Each gate line G is pulled out to outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example. The gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which an auxiliary capacitance voltage is impressed.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is an oblique electric field slightly oblique with respect to a X-Y pane specified by the first direction and the second direction, i.e., the substrates, or lateral electric field substantially in parallel with the principal surface of the substrates.

The switching element SW is constituted by an n channel type thin film transistor (TFT), for example. The switching element SW is electrically connected with the gate line G and the source line S. The (m×n) switching elements SW are formed in the active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel and electrically connected with the switching element SW. The common electrode CE is arranged in common to the plurality of pixel electrodes PE through the liquid crystal layer LQ. Though the pixel electrode PE and the common electrode CE are formed by light transmissive conductive materials, such as Indium Tin Oxide (ITO), Indium Zinc Oxide (IZO), etc., other metals such as aluminum may be used.

The array substrate AR includes an electric power supply portion VS formed outside of the active area ACT to impress a voltage to the common electrode CE. Furthermore, the common electrode CE on the counter substrate CT is drawn to outside of the active area ACT and electrically connected with an electric power supply portion VS formed in the array substrate AR through an electric conductive component which is not illustrated.

Figure 2:
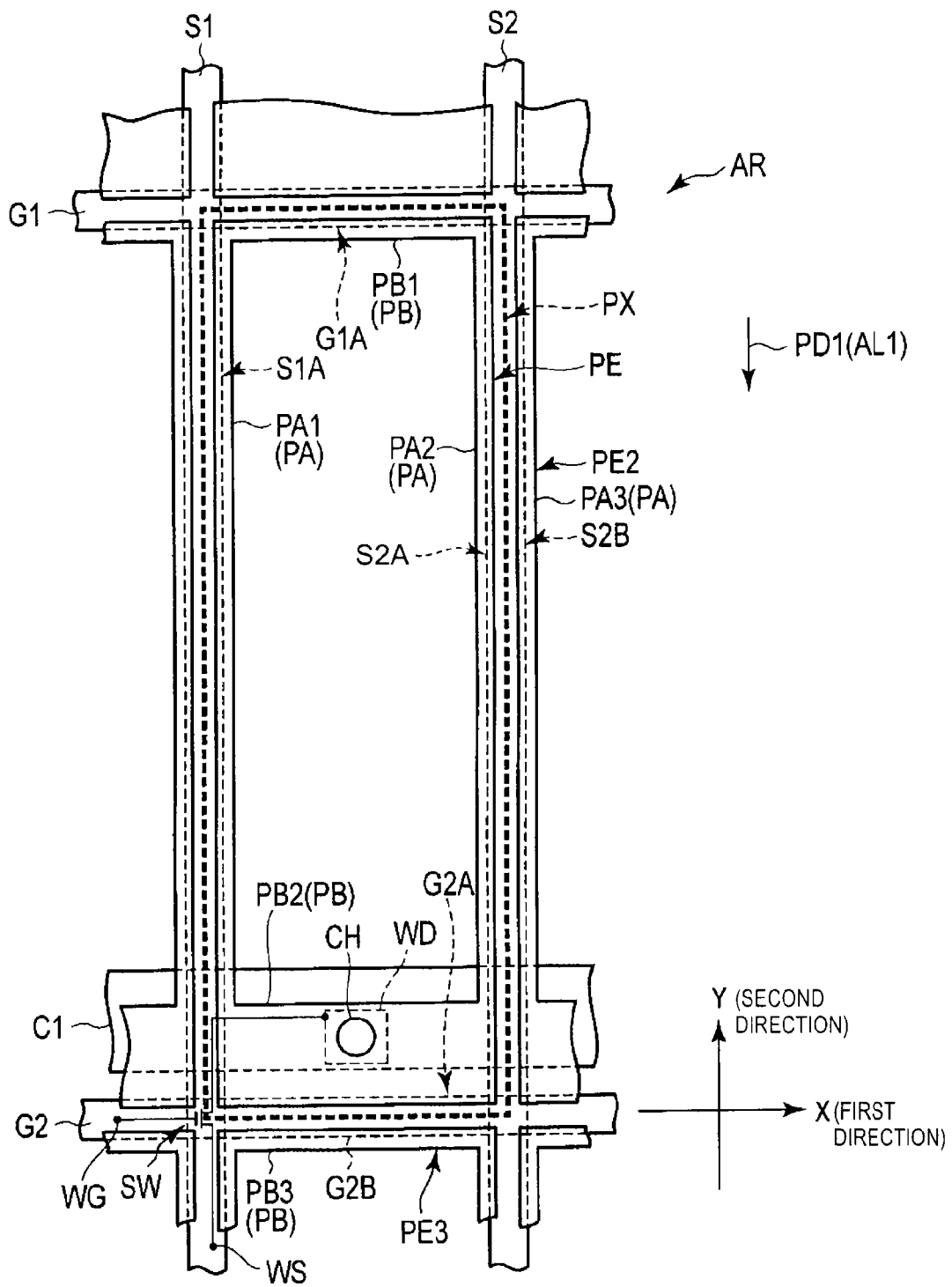
FIG. 2 is a plan view schematically showing a structure of one pixel when an array substrate shown in FIG. 1 is seen from a counter substrate side according to a first embodiment.

FIG. 2 is a plan view schematically showing the structure of one pixel when the liquid crystal display panel according to a first embodiment is seen from the counter substrate side. Herein, a plan view in the X-Y plane specified by the first direction X and the second direction Y is shown.

The array substrate AR is equipped with a gate line G1, a gate line G2, an auxiliary capacitance line C1, a source line S1, a source line S2, a switching element SW, the pixel electrode PE, and a first alignment film AL1, etc.

As shown in FIG. 2, the pixel PX has the shape of a rectangle whose length in the first direction X is shorter than the length in the second direction Y, as shown in a dashed line. The gate line G1 and the gate line G2 are arranged along the second direction Y with a first pitch and extend along the first direction X, respectively. The auxiliary capacitance line C1 is arranged between the gate line G1 and the gate line G2 and extends in the first direction X. The source line S1 and the source line S2 are arranged with a second pitch in the first direction X and extend along the second direction Y, respectively.

In the illustrated example, the source line S1 is arranged at the left-hand side end in the pixel PX. Precisely, the source line S1 is arranged striding over a boundary between the illustrated pixel and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side. The length of the pixel along the first direction X corresponds to the second pitch.

Moreover, in the pixel PX, the gate line G1 is arranged at an upper end portion. Precisely, the gate line G1 is arranged striding over a boundary between the illustrated pixel and a pixel which adjoins the illustrated pixel PX on its upper end side. The gate line G2 is arranged at a lower end portion. Precisely, the gate line G2 is arranged striding over a boundary between the illustrated pixel and a pixel adjoining the illustrated pixel PX on its lower end side. The length of the pixel along the second direction Y corresponds to the first pitch. The first pitch is larger than the second pitch.

Moreover, in the illustrated pixel PX, the auxiliary capacitance line C1 is eccentrically-located on the gate line G2 side rather than the gate line G1 side. That is, the distance between the auxiliary capacitance line C1 and the gate line G2 in the second direction Y is smaller than that between the auxiliary capacitance line C1 and the gate line G1 in the second direction Y.

The switching element SW is electrically connected with the gate line G2 and the source line S1 in the illustrated example. Namely, the switching element SW is formed in an intersection of the gate line G2 with the source line S1. A gate electrode WG of the switching element is connected with the gate line G2 and a source electrode WS is connected with the source line S1. A drain electrode WD connected with a drain line extending along the source line S1 and the auxiliary capacitance line C1 is electrically connected with the pixel electrode PE through a contact hole CH in a region which overlaps with the auxiliary capacitance line C1. The switching element SW is formed in the overlapped region with the source line S1 and the auxiliary capacitance line C1, and hardly runs off the overlapped region. Thereby, reduction of the area of an aperture which contributes to the display is suppressed when the switching element SW is arranged in the pixel PX.

A pixel electrode PE is equipped with a main pixel electrode PA and a sub-pixel electrode PB electrically connected mutually. The pixel electrode PE is equipped with two main pixel electrodes PA, i.e., a main pixel electrode PA1 and a main pixel electrode PA2, and two sub-pixel electrodes PB, i.e., a sub-pixel electrode PB1 and a sub-pixel electrode PB2 in this embodiment. The main pixel electrode PA1, the main pixel electrode PA2, the sub-pixel electrode PB1, and the sub-pixel electrode PB2 are integrally and continuously formed.

The main pixel electrode PA1 and the main pixel electrode PA2 extend along the second direction Y, respectively. In the illustrated example, the main pixel electrode PA1 is located near the left-hand side end of the pixel PX, and arranged on an inside edge S1A of the source line S1. Moreover, the main pixel electrode PA1 linearly extends from an intersection portion of the gate line G1 with the source line S1 to the intersection of the gate line G2 with the source line S1. The main pixel electrode PA1 is formed in the shape of a belt having substantially the same width along the first direction. The main pixel electrode PA2 is located near the right-hand side end of the pixel PX, and arranged on an inside edge S2A of the source line S2. The main pixel electrode PA2 linearly extends from an intersection portion of the gate line G1 with the source line S2 to an intersection portion of the gate line G2 with the source line S2. The main pixel electrode PA2 is formed in the shape of a belt having substantially the same width along the first direction X. The respective widths of the main pixel electrode PA1 and main pixel electrode PA2 are substantially the same and smaller than the second pitch between the source lines or the length of the pixel in the first direction X.

In addition, the contact hole CH is located in an approximately middle portion between the main pixel electrode PA1 and the main pixel electrode PA2. That is, the distance from the contact hole CH to the main pixel electrode PA1 in the first direction X is substantially the same as that from the contact hole CH to the main pixel electrode PA2 in the first direction X.

The sub-pixel electrode PB1 and the sub-pixel electrode PB2 extend along the first direction X, respectively. In this embodiment, the sub-pixel electrode PB1 is located near the upper end of the pixel PX, and arranged on an inside edge G1A of the gate line G1. Moreover, the sub-pixel electrode PB1 linearly extends from an intersection portion of the gate line G1 with the source line S1 to an intersection of the gate line G1 with the source line S2, and connects one end portion of the main pixel electrode PA1 and one end portion of the main pixel electrode PA2. The sub-pixel electrode PB1 is formed in the shape of a belt having substantially the same width along the second direction Y. The sub-pixel electrode PB2 is located near the lower side end of the pixel PX, and arranged on an inside edge G2A of the gate line G2. The sub-pixel electrode PB2 linearly extends from an intersection portion of the gate line G2 with the source line S1 to an intersection portion of the gate line G2 with the source line S2, and connects the other end portions of the main pixel electrode PA1 and the other end portion of the main pixel electrode PA2. The sub-pixel electrode PB2 is formed in the shape of a belt having substantially the same width along the second direction Y. The width of the sub-pixel electrode PB2 is larger than the width of sub-pixel electrode PB1. In this embodiment, the sub-pixel electrode PB2 is located also on the auxiliary capacitance line C1. That is, the sub-pixel electrode PB2 is located striding over the gate line G2 and the auxiliary capacitance line C1. The sub-pixel electrode PB2 is in contact with the drain electrode WD through the contact hole CH. Each width of the sub-pixel electrode PB1 and the sub-pixel electrode PB2 is smaller than the first pitch or the length of the pixel PX in the second direction Y.

The above pixel electrode PE is formed in the shape of a frame.

Here, the edge S1A of the source line S1 and the edge S2A of the source line S2 extend along the second direction Y. The edge G1A of the gate line G1 and the edge G2A of the gate line G2 extend along the first direction X. The edge S1A, the edge S2A, the edge G1A, and the edge G2A are inside edges of the pixel facing the contact hole CH. That is, the edges face the contact hole CH in which the switching element SW of the pixel is electrically connected with the pixel electrode PE.

The positional relationship between the pixel electrode PE of the pixel PX and the pixel electrode of the adjoining pixel is explained.

The pixel electrodes PE of the pixels which adjoin in the first direction X are apart from each other, and insulated electrically. For example, if its attention is paid between the pixels which adjoin in the first direction X on both sides of the source line S2, the main pixel electrode PA2 of the pixel electrode PE of the pixel PX is located on the edge S2A of the source line S2, and a main pixel electrode PA3 of a pixel electrode PE2 which adjoins the pixel electrode PE is located on one edge S2B of another side of the source line S2. A gap which is not covered with any conductive layers or pixel electrodes is formed on the source line S2 between the pixel electrode PE and pixel electrode PE2.

Similarly, the pixel electrodes of the pixels which adjoin in the second direction Y are apart from each other, and are insulated electrically. For example, if its attention is paid between the pixels which adjoin in the second direction Y on both sides of the gate line G2, the sub-pixel electrode PB2 of the pixel electrode PE of the pixel PX is located on the edge G2A of the gate line G2, and the sub-pixel electrode PB3 of a pixel electrode PE3 which adjoins the pixel electrode PE is located on one edge G2B of another side of the gate line G2. A gap which is not covered with any conductive layers or pixel electrodes is formed on the gate line G2 between the pixel electrode PE and the pixel electrode PE3.

Thus, in the active area, the main pixel electrode PA of the pixel electrode PE counters the edge of the source line S except for an intersection portion of the source line S with the gate line G. For this reason, a gap is not formed between the edge of the source line S and the pixel electrode PE. Similarly, the sub-pixel electrode PB of the pixel electrode PE counters the edge of the gate line G except for an intersection portion of the gate line G with source line S. For this reason, a gap is not formed between the edge of the gate line G and the pixel electrode PE.

The pixel electrode PE is covered with a first alignment film AL1 in the array substrate AR. In order to carry out initial alignment of the liquid crystal molecule of the liquid crystal layer LQ along a first alignment direction PD1, alignment treatment (for example, rubbing processing or optical alignment processing) is made to the first alignment direction PD1. The first alignment direction PD1 is substantially in parallel with the second direction Y which is an extending direction of the main pixel electrode PA.

Figures 3A, 3B, 3C:
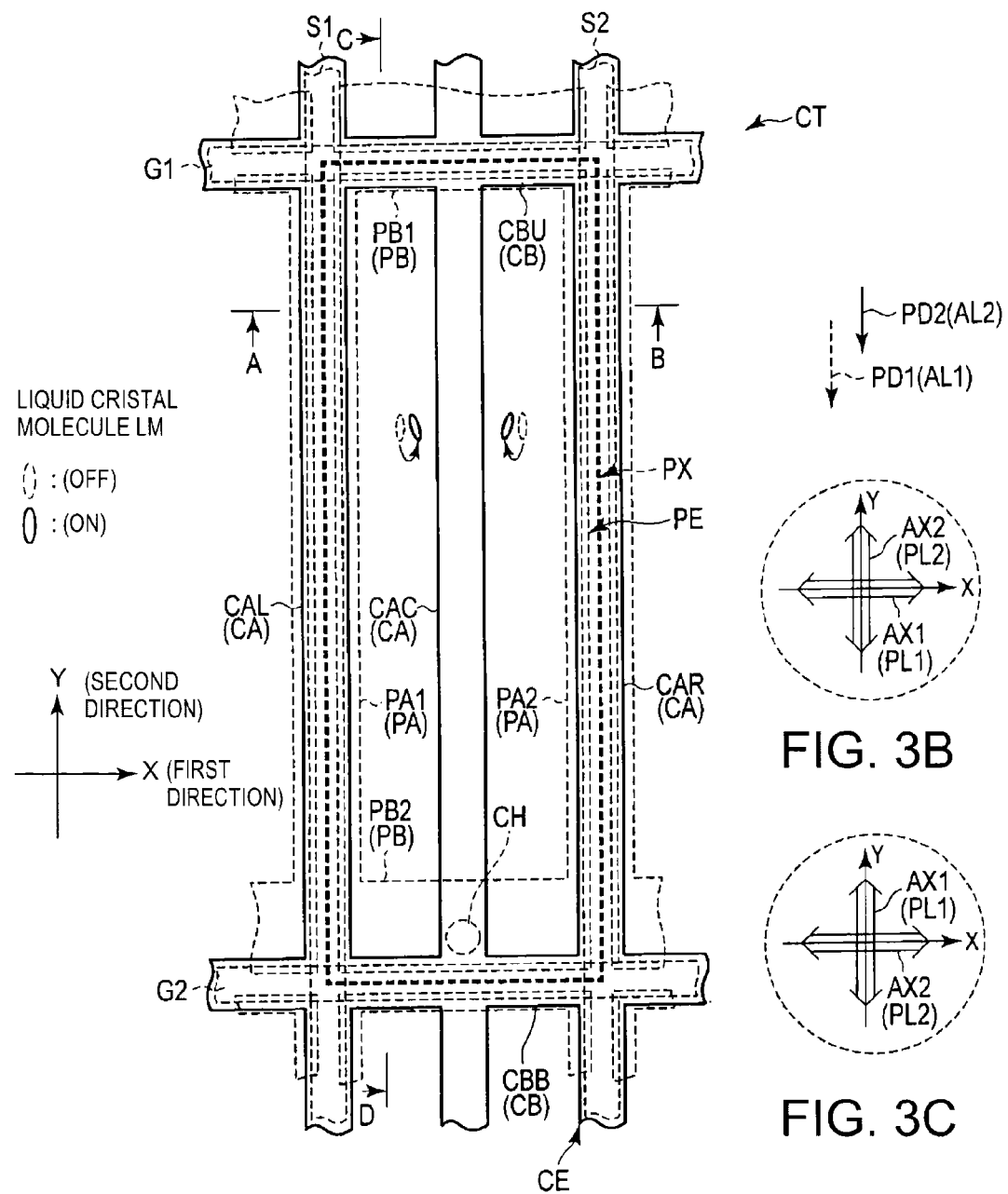
FIG. 3A is a plan view schematically showing the structure of one pixel in the counter substrate shown in FIG. 1.
FIGS. 3B and 3C show the relationship between a polarization axis and an initial alignment direction.

FIG. 3A is a plan view schematically showing the structure of one pixel in the counter substrate shown in FIG. 1. Here, the plan view in the X-Y plane is shown. In addition, only the structure required for explanation is illustrated. Herein, principal elements such as the pixel electrode PE, the source line S, the gate line G, and the auxiliary capacitance line C, etc., are shown in a dashed line.

The common electrode CE includes a main common electrode CA in the counter substrate CT. In this embodiment, the common electrode CE includes a sub-common electrode CB in the counter substrate CT. The main common electrodes CA and the sub-common electrode CB are formed integrally or continuously, and are electrically connected mutually. However, the sub-common electrode CB may be eliminated.

The main common electrode CA extends linearly along the second direction Y substantially in parallel with the extending direction of the main pixel electrode PA. While the main common electrode CA is arranged above the source line and between the main pixel electrodes PA, the main common electrode CA extends along the second direction Y in parallel with the extending direction of the main pixel electrode PA. The main common electrode CA is formed in the shape of a belt having substantially the same width along the first direction X.

In this embodiment, the main common electrode CA is arranged in three lines in parallel each other in the first direction X. That is, three main common electrodes CA are arranged with the same pitch therebetween along the first direction X. In the pixel PX, the main common electrode CAL is arranged at the left-hand side end, the main common electrode CAR is arranged at the right-hand side end, and the main common electrode CAC is arranged in the center of the pixel PX. Precisely, the main common electrode CAL is arranged striding over a boundary between the illustrated pixel and the adjoining pixel on its left-hand side, and the main common electrode CAR is arranged striding over a boundary between the illustrated pixel and the adjoining pixel on its right-hand side. The main common electrode CAL is located above the source line S1, the main common electrode CAR is located above the source line S2, and the main common electrode CAC is located between the main pixel electrode PA1 and the main pixel electrode PA2 passing the upper portion of the contact hole CH.

That is, while the main common electrode CAL is arranged striding over the pixel electrodes PE of the illustrated pixel PX and the adjoining pixel PX on its left-hand side, the main common electrode CAL counters with the source line S1 in the gap between both pixel electrodes PE. Further, while the main common electrode CAR is arranged striding over the pixel electrodes PE of the illustrated pixel and the adjoining pixel PX on its right-hand side, the main common electrode CAR counters with the source line S2 in the gap between both pixel electrodes. The main common electrode CAC arranged in the center of the pixel is located substantially in the middle portion between the main pixel electrode PA1 and the main pixel electrode PA2. In the X-Y plane, the distance between the main pixel electrode PA1 and the main common electrode CAC in the first direction X is substantially the same as that between the main pixel electrode PA2 and the main common electrode CAC in the first direction X.

While the sub-common electrode CB is located above the gate line G, the sub-common electrode CB is connected with the main common electrode CA, and linearly extends along the first direction X. The sub-common electrode CB is formed in the shape of a belt having substantially the same width along the second direction Y. Moreover, the sub-common electrode CB is formed integrally or continuously, and electrically connected with the main common electrode CA. That is, in the counter substrate CT, the common electrode CE is formed in the shape of a lattice.

In this embodiment, the sub-common electrode CB is arranged in two lines in parallel each other in the second direction Y on the upper-and-lower both ends of the pixel PX, respectively. That is, two sub-common electrodes CB are arranged in one pixel. In the pixel PX, a sub-common electrode CBU is arranged at the upper side end, and the sub-common electrode CBB is arranged at the lower side end. Precisely, the sub-common electrode CBU is arranged striding over a boundary between the illustrated pixel PX and the adjoining pixel PX on its upper side, and the sub-common electrode CBB is arranged striding over a boundary between the illustrated pixel PX and the adjoining pixel on its lower side. The sub-common electrode CBU is located above the gate line G1, and the sub-common electrode CBB is located above the gate line G2.

That is, the sub-common electrode CBU is arranged striding over the pixel electrodes PE of the pixel and the adjoining pixel PX on its upper side, and counters with the gate line G1 in a gap between both pixel electrodes. Further, the sub-common electrode CBB is arranged striding over the pixel electrodes PE of the pixel and the adjoining pixel PX on its lower side, and counters with the gate line G2 in a gap between both pixel electrodes.

The main electric field for driving the liquid crystal molecule LM in the domain which substantially contributes to a display is formed between the main pixel electrode PA and the main common electrode CAC. However, electric field formed between the sub-common electrode CB above the gate line G and the pixel electrode PE, and between the main common electrode CAL and the main common electrode CAR above the source line S and the pixel electrode PE also acts on the liquid crystal molecule LM. The edges in the second direction Y of the illustrated main common electrode CAL and the main common electrode CAR are located right above the main pixel electrode PA, respectively, and do not extend to the inner side of the pixel PX beyond the main pixel electrode PA. Moreover, the edges of the illustrated sub-common electrodes CB in the first direction X are located right above the sub-pixel electrode PB, respectively, and do not extend to the inner side of the pixel PX beyond the sub-pixel electrode PB. Since the relative positional relationship between the edge of the pixel electrode PE and the edges of the main common electrodes CA and the sub-common electrode CB affects the main electric field between the pixel electrode PE and the common electrode CE, the relationship is set up so as to form the desired alignment state of the liquid crystal layer LQ. For this reason, the edges of the main common electrode CAL and the main common electrode CAR may extend up to the inner side of the pixel PX beyond the main pixel electrode PA. Further, the edges of the sub-common electrode CB may extend up to the inner side of the pixel PX beyond the sub-pixel electrode PB.

The common electrode CE is covered with a second alignment film AL2 in the counter substrate CT. In order to carry out initial alignment of the liquid crystal molecule of the liquid crystal layer LQ, alignment treatment (for example, rubbing processing or optical alignment processing) is made to a second alignment film AL2 along with a second alignment treatment direction PD2. The second alignment treatment direction PD2 to initially align the liquid crystal molecule is substantially in parallel with the first alignment treatment direction PD1, and the same direction each other or opposite direction to the first alignment treatment direction PD1. In the illustrated example, the second alignment treatment direction PD2 is in parallel to the second direction Y. Further, in the X-Y plane, the second alignment treatment direction PD2 is in parallel with and the same direction as the first alignment treatment direction PD1 each other.

Figure 4:
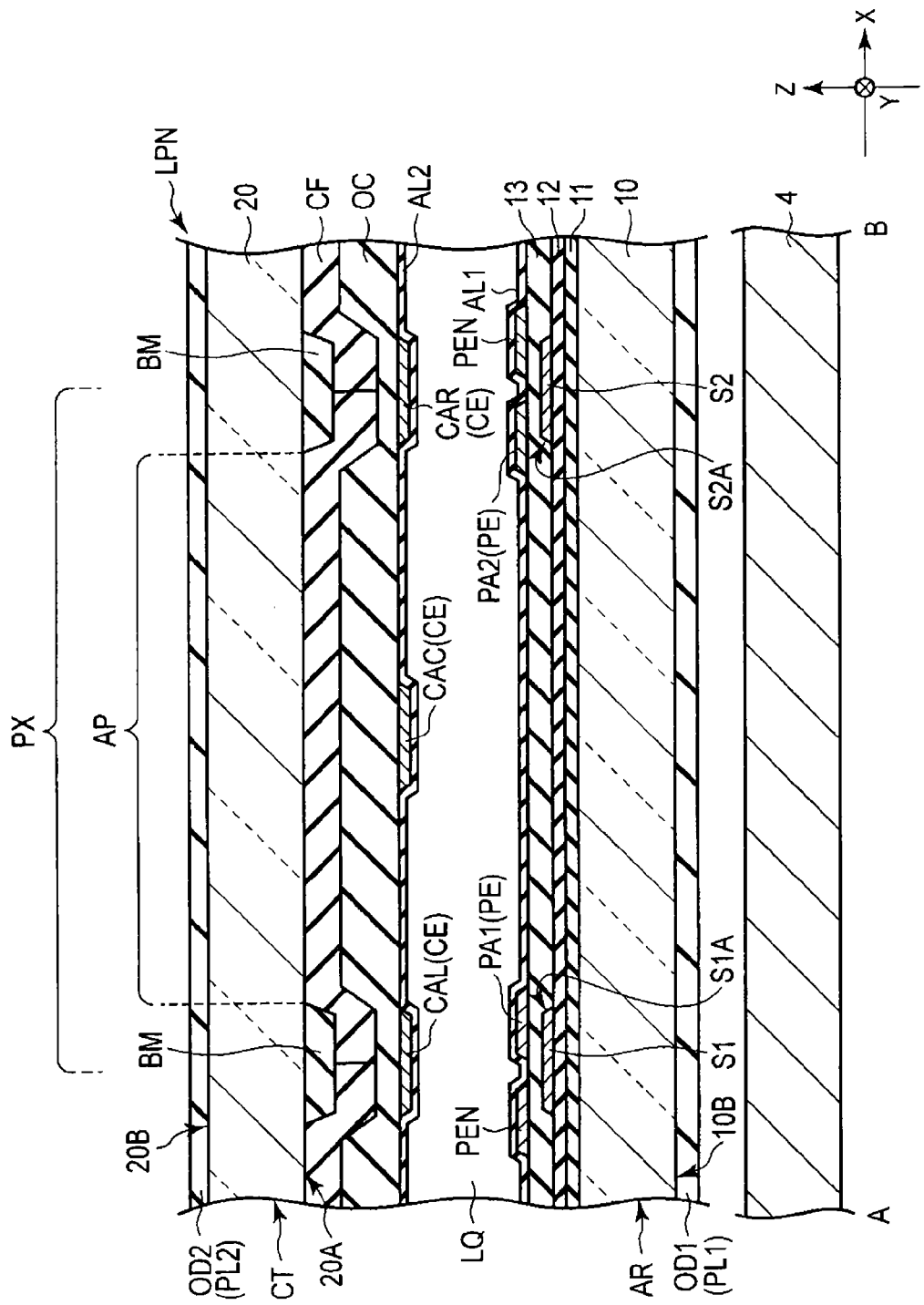
FIG. 4 is a cross-sectional view schematically showing the structure of the liquid crystal display panel taken along line A-B shown in FIG. 3A, seen from a gate line G1 side.
Figure 5:
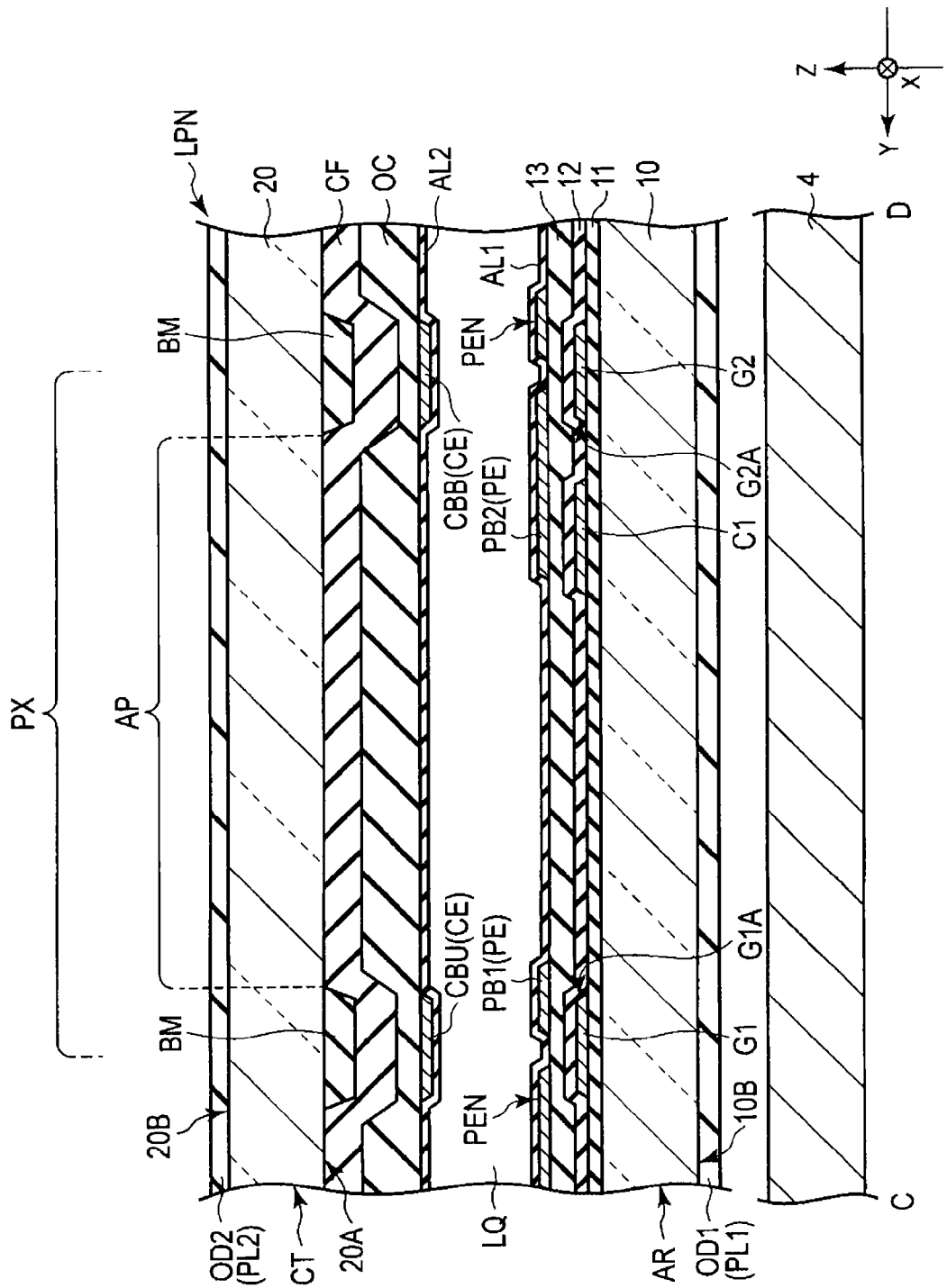
FIG. 5 is a cross-sectional view schematically showing the structure of the liquid crystal display panel taken along line C-D shown in FIG. 3A, seen from a source line S1 side.

FIG. 4 is a cross-sectional view schematically showing the structure of the liquid crystal display panel taken along line A-B shown in FIG. 3A, seen from the gate line G1 side. FIG. 5 is a cross-sectional view schematically showing a structure of the liquid crystal display panel taken along line C-D shown in FIG. 3A, seen from the source line S1 side.

A backlight 4 is arranged on the back side of the array substrate AR in the illustrated example. Various types of backlights 4 can be used. For example, a light emitting diode (LED) or a cold cathode fluorescent lamp (CCFL), etc., can be applied as a light source of the backlight 4, and the explanation about its detailed structure is omitted.

The array substrate AR is formed using a first transmissive insulating substrate 10. The array substrate AR includes the gate line G1, the gate line G2, the auxiliary capacitance line C1, the source line S1, the source line S2, the pixel electrode PE, a first insulating film 11, a second insulating film 12, a third insulating film 13, and the first alignment film AL1, etc., in the inner side of the first insulating substrate 10, i.e., on a side facing the counter substrate CT.

The gate line G1, the gate line G2, and the auxiliary capacitance line C1 are formed on the first insulating film 11, and are covered with the second insulating film 12. The source line S1 and the source line S2 are formed on the second insulating film 12, and are covered with the third insulating film 13. That is, the second insulating film 12 corresponds to an interlayer insulating film between the gate lines G1, G2 and the source lines S1, S2.

The main pixel electrode PA and the sub-pixel electrode PB of the pixel electrode PE are formed on the upper surface of the same insulating film, i.e., the upper surface of the insulating film 13. The main pixel electrode PA1 is located on the edge S1A of the source line S1, and the main pixel electrode PA2 is located on the edge S2A of the source line S2. The sub-pixel electrode PB1 is located on the edge G1A of the gate line G1, and the sub-pixel electrode PB2 is located on the edge G2A of the gate line G2. Moreover, the sub-pixel electrode PB2 is arranged striding over the auxiliary capacitance line C1 from the gate line G2, and a portion thereof is located on the auxiliary capacitance line C1. While the pixel electrode PEN of the adjoining pixel is formed on the surface of the insulating film 13 like the pixel electrode PE of the pixel PX, the pixel electrode PEN is apart from the pixel electrode PE.

The first alignment film AL1 is arranged on the array substrate AR facing the counter substrate CT, and extends to whole active area ACT. The first alignment film AL1 covers the pixel electrode PE, and is arranged also on the third interlayer insulating film 13. The first alignment film AL1 is formed of the material which shows a horizontal alignment characteristics.

The counter substrate CT is formed using a second insulating substrate 20 which has a transmissive characteristics. The counter substrate CT includes a black matrix BM, a color filter CF, an overcoat layer OC, the common electrode CE, and the second alignment film AL2, etc., in the internal surface of the second insulating substrate 20 facing the array substrate AR.

The black matrix BM is formed on the second insulating substrate 20 defining each pixel PX, and forms an aperture portion AP. That is, the black matrix BM is arranged so that line portions, i.e., the source line S, the gate line G, the auxiliary capacitance line C, the switching element SW, may counter the black matrix BM. Herein, the black matrix BM includes a portion located above the source lines S1 and S2 extending along the second direction Y, and a portion located above the gate lines G1 and G2 extending along the first direction X, and is formed in the shape of a lattice. The black matrix BM is formed in an internal surface 20A of the second insulating substrate 20 facing the array substrate AR.

The color filter CF is arranged corresponding to each pixel PX. That is, while the color filter CF is arranged in the internal surface 20A of the second insulating substrate 20, a portion thereof runs on the black matrix BM. The colors of the color filters CF arranged in adjoining pixels PX in the first direction X differ mutually. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM.

The overcoat layer OC covers the color filter CF. The overcoat layer OC eases influence of concave-convex of the surface of the color filter CF.

The main common electrode CAL, the main common electrode CAC, the main common electrode CAR, the sub-common electrode CBU, and the sub-common electrode CBB of the common electrode CE are formed the overcoat layer OC facing the array substrate AR.

The main common electrode CAL is located under the black matrix BM, and located right above the source line S1. The main common electrode CAL counters the main pixel electrode PA1 of the pixel electrode PE and the adjoining pixel electrode PEN so as to stride over. The main common electrode CAR is located under the black matrix BM, and located right above the source line S2. The main common electrode CAR counters the main pixel electrode PA2 of the pixel electrode PE and the adjoining pixel electrode PEN so as to stride over. The sub-common electrode CBU is located under the black matrix BM, and located above the gate line G1. The sub-common electrode CBU counters the sub-pixel electrode PB1 of the pixel electrode PE and the adjoining pixel electrode PEN so as to stride over. The sub-common electrode CBB is located under the black matrix BM, and located above the gate line G2. The sub-common electrode CBB counters the sub-pixel electrode PB2 of the pixel electrode PE and the adjoining pixel electrode PEN so as to stride over.

In the above-mentioned aperture region AP, the region between the pixel electrode PE and the common electrodes CE, that is, between the main pixel electrode PA1 and the main common electrodes CAC, and between the main pixel electrode PA2 and the main common electrodes CAC corresponds to a transmissive region in which the backlight can penetrate.

The second alignment film AL2 is arranged on the counter substrate CT facing the array substrate AR, and extends to whole active area ACT. The second alignment film AL2 covers the common electrode CE, the overcoat layer OC, etc. The second alignment film AL2 is formed of the materials having horizontal alignment characteristics.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed, for example. The array substrate AR and the counter substrate CT are pasted together by seal material which is not illustrated, in which the predetermined cell gap is formed, for example.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is not illustrated. The liquid crystal layer LQ is constituted, for example, by positive type liquid crystal material.

In addition, the distance between the main pixel electrode PA and the main common electrode CA in the first direction X is larger than the thickness of the liquid crystal layer LQ. For example, the distance between the main pixel electrode PA and the main common electrode CA is larger more than twice than the thickness of the liquid crystal layer LQ.

A first optical element OD1 is attached on an external surface 10B of the array substrate AR, i.e., the external surface of the first insulating substrate 10 which constitutes the array substrate AR, by adhesives, etc. The first optical element OD1 is located in a side which counters with the backlight unit 4 of the liquid crystal display panel LPN, and controls the polarization state of the incident light which enters into the liquid crystal display panel LPN from the backlight unit 4. The first optical element OD1 includes a first polarizing plate PL1 having a first polarization axis (or first absorption axis) AX1. Other optical elements such as retardation film may be arranged between the first polarizing plate PL1 and the first insulating substrate 10.

A second optical element OD2 is attached on an external surface 20B of the counter substrate CT, i.e., the external surface of the second insulating substrate 20 which constitutes the counter substrate CT, by adhesives, etc. The second optical element OD2 is located in a display surface side of the liquid crystal display panel LPN, and controls the polarization state of emitted light from the liquid crystal display panel LPN. The second optical element OD2 includes a second polarizing plate PL2 having a second polarization axis (or second absorption axis) AX2. Other optical elements such as retardation film may be arranged between the second polarizing plate PL2 and the second insulating substrate 20.

The first polarization axis AX1 of the first polarizing plate PL1 and the second polarization axis AX2 of the second polarizing plate PL2 are arranged in the Cross Nicol state in which they substantially intersects perpendicularly. At this time, one polarizing plate is arranged so that its polarization axis is arranged substantially in parallel with or in orthogonal with the extending direction of the main pixel electrode PA or the main common electrode CA. That is, when the extending directions of the main pixel electrode PA and the main common electrode CA are the second direction Y, the absorption axes of one polarizing plate is substantially in parallel with the second direction Y (crossing orthogonally with the first direction X), or crosses orthogonally with the second direction Y (in parallel with the first direction X).

Or one polarizing plate is arranged, for example, so that the polarization axis is arranged in an initial alignment direction of the liquid crystal molecule, i.e., in orthogonal with or in parallel with the first alignment treatment direction PD1 or the second alignment treatment direction PD2. When the initial alignment direction is in parallel with the second direction Y, the polarization axis of one polarizing plate is in parallel with the second direction Y or the first direction X.

In one example shown in FIG. 3B, the first polarizing plate PL1 is arranged so that the first polarization axis AX1 orthogonally intersects the extending direction of the main pixel electrode PA, i.e., the initial alignment direction (the second direction Y) of the liquid crystal molecule LM. The first polarization axis AX1 is arranged in parallel with the first direction X. The second polarizing plate PL2 is arranged so that the second polarization axis AX2 is arranged in parallel with the extending direction of the main pixel electrode PA, i.e., the initial alignment direction of the liquid crystal molecule LM. The second polarization axis AX2 is arrange in parallel with the second direction Y.

In other example shown in FIG. 3C, the second polarizing plate PL2 is arranged so that the second polarization axis AX2 orthogonally intersects the extending direction of the main pixel electrode PA, i.e., the initial alignment direction of the liquid crystal molecule LM. The second polarization axis AX2 is arranged in parallel with the first direction X. The first polarizing plate PL1 is arranged so that the first polarization axis AX1 is arranged in parallel with the extending direction of the main pixel electrode PA, i.e., the initial alignment direction of the liquid crystal molecule LM. The first polarization axis AX1 is arranged in parallel with the second direction Y.

Next, an operation of the liquid crystal display panel LPN of the above-mentioned structure is explained.

At the time of non-electric field state, i.e., when a potential difference (i.e., electric field) is not formed between the pixel electrode PE and the common electrode CE, the liquid crystal molecules LM of the liquid crystal layer LQ are aligned so that their long axis are aligned in a parallel direction with the first alignment treatment direction PD1 of the first alignment film AL1 and the second alignment treatment direction PD2 of the second alignment film AL2 as shown with a dashed line in the figure. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. Hereinafter, in order to explain simply, it is assumed that the liquid crystal molecule LM aligns in parallel with the X-Y plane, and rotates in parallel with the X-Y plane.

Here, both of the first alignment treatment direction PD1 of the first alignment film AL1 and the second alignment treatment direction PD2 of the second alignment film AL2 are directions in parallel to the second direction Y. At the time of OFF, the long axis of the liquid crystal molecule LM is initially aligned substantially in parallel to the second direction Y as shown by a dashed line in FIG. 3.

When the first alignment treatment direction PD1 and the second alignment treatment direction PD2 are in parallel and the same direction, in the cross section of the liquid crystal layer LQ, the liquid crystal molecule LM aligns substantially in a horizontal direction near the intermediate portion of the liquid crystal layer LQ (pre-tilt angle is substantially zero). That is, the liquid crystal molecule LM aligns with the pre-tilt angle in symmetrical with respect to the intermediate portion in vicinities of the first alignment film AL1 and the second alignment film AL2 (splay alignment). In the splay alignment state of the liquid crystal molecule LM, the display is optically compensated even in an inclining direction from the normal direction of the substrate by the molecules near the first alignment film AL1 and the second alignment film AL2. Therefore, when the first alignment film AL1 and the second alignment film AL2 are in parallel and the same direction mutually, there are few optical leaks in a black display. Accordingly, high contrast ratio can be realized, and it becomes possible to improve display grace.

In addition, when the first alignment film AL1 and the second alignment film AL2 are in parallel and opposite direction each other, in the cross section of the liquid crystal layer LQ, the liquid crystal molecule LM aligns with a uniform pre-tilt angle, in the intermediate portion of the liquid crystal layer LQ, near the first alignment film AL1 and the second alignment film AL2 (homogeneous alignment).

At the time of OFF, a portion of the backlight from the backlight 4 penetrates the first polarizing plate PL1, and enters into the liquid crystal display panel LPN. The light which entered into the liquid crystal display panel LPN is linearly polarized light which intersects perpendicularly with the first absorption axis AX1 of the first polarizing plate PL1. The polarization state of the linearly polarized light changes with the alignment state of the liquid crystal molecule LM when the linearly polarized light passes the liquid crystal layer LQ. However, at the time of OFF, the polarization state of the linearly polarized light which passes the liquid crystal layer LQ hardly changes. For this reason, the linearly polarized light which penetrates the liquid crystal display panel LPN is absorbed by the second polarizing plate PL2 which is arranged in Cross Nicol positional relationship with the first polarizing plate PL1 (black display).

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the long axis rotates in parallel with the X-Y plane as shown in a solid line in the figure.

In the example shown in FIG. 3A, in the region of the left-hand half of the pixel PX, i.e., the transmissive region between the main pixel electrode PA1 and the main common electrode CAC, the liquid crystal molecule LM mainly rotates counterclockwise to the second direction Y, and aligns so that it may turn to the lower right in the figure. On the other hand, in the region of the right-hand half of the pixel PX, i.e., the transmissive region between the main pixel electrode PA2 and the main common electrode CAC, the liquid crystal molecule LM mainly rotates clockwise to the second direction Y, and aligns so that it may turn to the lower left in the figure.

Thus, in each pixel PX, in case electric field is formed between the pixel electrode PE and the common electrode CE, the alignment direction of the liquid crystal molecule LM is divided into two or more directions by the position which overlaps with the pixel electrode PE, and domains are formed in each alignment direction. That is, two or more domains are formed in one pixel PX.

At the time of ON, a portion of the backlight which entered into the liquid crystal display panel LPN from the backlight 4 penetrates the first polarizing plate PL1, and enters into the liquid crystal display panel LPN. The light which entered into the liquid crystal display panel LPN is linearly polarized light which intersects perpendicularly with the first absorption-axis AX1 of the first polarizing plate PL1. When the linearly polarized light passes the liquid crystal layer LQ, the polarization state of the linearly polarized light changes in accordance with the alignment state of the liquid crystal molecule LM. For example, if the linearly polarized light in parallel to the first direction X enters into the liquid crystal display panel LPN in the X-Y plane, when passing the liquid crystal layer LQ, the light receives the influence of phase difference by $\lambda/2$ by the liquid crystal molecule LM which is aligned in a 45°-225° direction or a 135°-315° direction with respect to the first direction X (herein, $\lambda$ is a wavelength of the light which penetrates the liquid crystal layer LQ). Thereby, the polarization state of the light which passes the liquid crystal layer LQ becomes linearly polarized light in parallel to the second direction Y. For this reason, at the time of ON, at least a portion of the light which passes the liquid crystal layer LQ penetrates the second polarizing plate PL2 (white display). However, in the position which overlaps with the pixel electrode or the common electrode, since the liquid crystal molecule maintains the initial alignment state, it becomes a black display like at the time of OFF.

According to this embodiment, the pixel electrode PE includes the main pixel electrode PA1 and the main pixel electrode PA2. The common electrode CE includes the main common electrode CAC located between the main pixel electrode PA1 and the main pixel electrode PA2. The pixel is displayed by driving the liquid crystal molecule, mainly using electric field between the main common electrode CAC and the main pixel electrode PA1, and between the main common electrode CAC and main pixel electrode PA2.

On the other hand, the main pixel electrode PA is located on the edge of the source line S. That is, a gap which may serve as a penetration region is not formed between the edge of the source line S and the pixel electrode PE. Moreover, the source line S is formed of an opaque electric conductive material. Even if the pixel electrode PE is formed of the transmissive electric material, the liquid crystal molecule LM in a region which overlaps with the pixel electrode PE maintains the initial alignment state regardless of the time of ON and OFF, and the region does not become a penetration region. For this reason, even if undesirable electric field is formed between the source line S and the pixel electrode PE, it becomes possible to suppress the light leak in the penetrating region due to the undesirable alignment of the liquid crystal molecule LM. Even if undesirable bias is impressed from the source line S to the liquid crystal layer LQ, it becomes possible to control generating of defect display (for example, cross talk). The cross talk is a following phenomenon. In case a pixel PX is set to a pixel potential which displays black, when a pixel potential which displays white is applied on the source line connected to the pixel PX, an optical leak arises from a portion of the pixel PX, and cause the rise of luminosity. According to this embodiment, it is not necessary to arrange other shield electrodes for shielding undesirable electric field from the source line S, and the risk of short-circuit between the pixel electrode PE and the shield electrode is also eliminated.

Moreover, the pixel electrode PE is equipped with the sub-pixel electrode PB located on the edge of the gate line G. That is, a gap which may serve as a penetration region is not formed between the edge of the gate line G and the pixel electrode PE. Moreover, the gate line G is formed of the opaque electric conductive material. The region which overlaps with the pixel electrode PE does not become a penetration region. For this reason, even if undesirable electric field is formed between the gate line G and the pixel electrode PE, it becomes possible to control the optical leak by the penetration region resulting from the alignment of the liquid crystal molecule LM in the undesirable direction. That is, even if undesirable bias is impressed from the gate line G to the liquid crystal layer LQ, it becomes possible to suppress the display defect such as a printed picture, further the optical leak resulting from the alignment defect of the liquid crystal molecule. Moreover, it is not necessary to arrange other shield electrodes for shielding undesirable electric field from the gate line G. The risk of short-circuit between the pixel electrode PE and the shield electrode is also eliminated.

Moreover, according to this embodiment, the common electrode CE is equipped with the main common electrode CA located above the source line S. For this reason, in the adjoining pixels in the first direction X, vertical electric field in the normal line direction Z perpendicular to the X-Y plane is formed between the source line S and the main common electrode CA. In the adjoining pixels in the second direction Y, vertical electric field in the normal line direction Z perpendicular to the X-Y plane is also formed between the gate line G and the sub-common electrode CB. While the liquid crystal molecule LM near the boundary between adjoining pixels aligns along the normal line direction Z by such vertical electric field, since the source line S, the gate line G, and the pixel electrode PE do not serve as a penetration region, it is possible to control the optical leak resulting from such vertical electric field.

Moreover, the leak of electric field does not occur to the outside of the pixel PX beyond the common electrode CE above the source line S and the gate line G by forming the vertical electric field, and undesirable electric field is not produced between the adjoining pixels. Therefore, even if it is a case where the colors of the color filter CF differ between the adjoining pixels, it becomes possible to control generating of mixed colors, and it also becomes possible to control the fall of color reproducibility nature and a contrast ratio.

Moreover, since high transmissivity is obtained in the electrode gap between the pixel electrode PE and the common electrode CE according to this embodiment, it becomes possible to correspond by expanding the inter-electrode distance between the pixel electrode PA and the main common electrode CA in order to make transmissivity of each pixel high enough. Moreover, in the product specifications in which a pixel pitch differs each other, a transmissive distribution peak can be used by changing the inter-electrode distance. That is, in the display mode according to this embodiment, it becomes possible to offer the display panel having various pixel pitches by setting up inter-electrode distance without necessarily using microscopic processing corresponding to the product specification from low resolution with a comparatively large pixel pitch to high resolution with a comparatively small pixel pitch.

Moreover, when an assembling shift occurs between the array substrate AR and the counter substrate CT, a difference may arises in distances between the respective common electrodes CA of the both sides of the pixel and the pixel electrode PA. However, the alignment shift is produced in common to all the pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is in a case where the colors of the color filter differ between the adjoining pixels, it becomes possible to control generating of mixed colors, and also becomes possible to suppress the falls of color reproducibility nature and the contrast ratio.

In this embodiment, the pixel electrode PE is formed in the shape of a frame equipped with the sub-pixel electrode PB1 and the sub-pixel electrode PB2 in addition to the main pixel electrode PA1 and the main pixel electrode PA2. However, the sub-pixel electrode PB2 may be arranged so as to cover the both the edge G2A and the edge G2B of the gate line G2. In this case, the sub-pixel electrode PB1 is eliminated, and the pixel electrode forms the shape of a U character.

Moreover, although the above embodiment explains the case where the initial alignment direction of the liquid crystal molecule LM is set in parallel to the second direction Y, the initial alignment direction of the liquid crystal molecule LM may be an oblique direction which obliquely crosses the first direction X and the second direction Y.

Moreover, although the case where the liquid crystal layer LQ is formed of the liquid crystal material which has positive dielectric constant anisotropy (positive type) is explained in the above embodiment, the liquid crystal layer LQ may be formed of the liquid crystal material having negative dielectric constant anisotropy (negative type).

Furthermore, at the time of ON, since horizontal electric field is hardly formed (or sufficient electric field to drive the liquid crystal molecule LM is not formed), the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, backlight hardly penetrates, and hardly contributes to the display at the time of ON. Therefore, the pixel electrode PE and the common electrode CE do not necessarily need to be formed of a transparent electric conductive material, and may be formed using such non-transparent electric conductive materials, aluminum (Al), titanium (Ti), silver (Ag), molybdenum (Mo), tungsten (W), and chromium (Cr).

When at least one of the pixel electrode PE and the common electrode CE is formed of the above-mentioned opaque electric conductive material, the linearly polarized light which entered into the liquid crystal display panel LPN is in parallel with or intersects perpendicularly the extending direction of the edge of the pixel electrode PE or the common electrode CE. Moreover, the extending direction of the gate line G, the auxiliary capacitance line C, and the source line S, respectively, formed of the above opaque electric conductive materials is substantially in parallel with or intersects perpendicularly the linearly polarized light. For this reason, in the reflected light by the edge of the pixel electrode PE, the common electrode CE, the gate line G, the auxiliary capacitance line C, and the source line S, the polarized face of the light is not disturbed easily, and the polarized face can be maintained in the state where the linearly polarized light passed the first polarizing plate PL1. Therefore, since the linearly polarized light which penetrated the liquid crystal display panel LPN at the time of OFF is fully absorbed by second polarizing plate PL2 which is a polarizer, it becomes possible to control optical leak. That is, transmissivity can be fully reduced in the case of a black display, and it becomes possible to control the fall of a contrast ratio. Moreover, it is not necessary to make the width of the black matrix BM large for the measure against the optical leak in the circumference of the pixel electrode PE or the common electrode CE. Accordingly, it becomes possible to control reduction of the area of the aperture portion AP and decrease of the transmissivity at the time of ON.

Next, a liquid crystal display device according to a second embodiment is explained.

Figure 6:
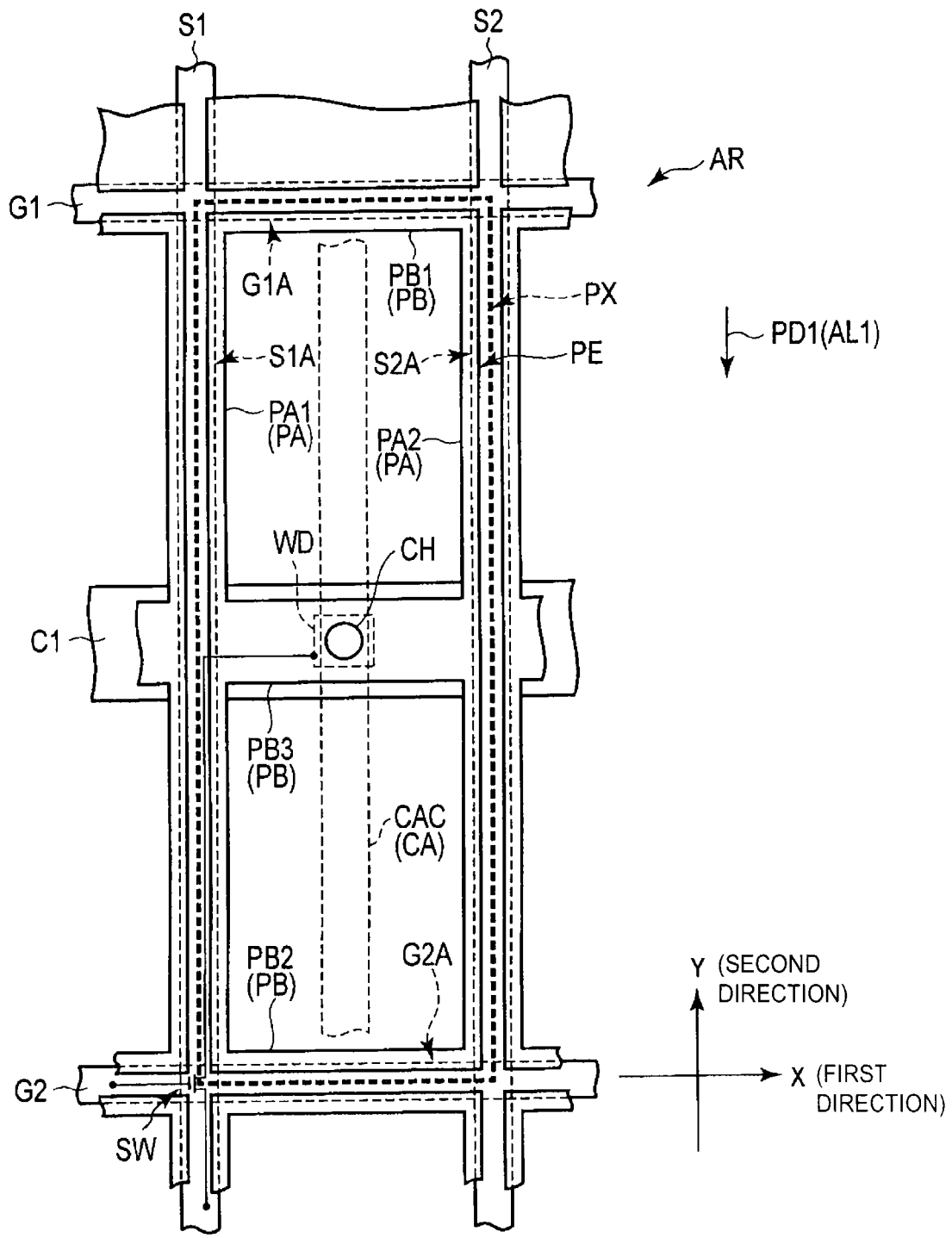
FIG. 6 is a plan view schematically showing the structure of one pixel in the array substrate shown in FIG. 1 when the array substrate is seen from the counter substrate side according to a second embodiment.

FIG. 6 is a plan view schematically showing the structure of one pixel in the array substrate shown in FIG. 1 when the array substrate is seen from the counter substrate side according to the second embodiment.

The second embodiment is different from the first embodiment shown in FIG. 2 in the following points. The first point is that the auxiliary capacitance line C1 is located in the approximately center portion between the gate line G1 and the gate line G2. The second point is that the pixel electrode PE includes a sub-pixel electrode PB1, a sub-pixel electrode PB2, and a sub-pixel electrode PB3 in addition to the main pixel electrode PA1 and the main pixel electrode PA2.

The distance between the auxiliary capacitance line C1 and the gate line G2 in the second direction Y is substantially the same as that between the auxiliary capacitance line C1 and the gate line G1 in the second direction Y.

In the pixel electrode PE, the main pixel electrode PA1, the main pixel electrode PA2, the sub-pixel electrode PB1, the sub-pixel electrode PB2, and the sub-pixel electrode PB3 are formed integrally or continuously, and they are electrically connected mutually. The sub-pixel electrode PB1, the sub-pixel electrode PB2, and the sub-pixel electrode PB3 extend along the first direction X, respectively, and are formed in the shape of a belt. The sub-pixel electrode PB1 is located on the edge G1A of the gate line G1, and connects each of the end portions of the main pixel electrode PA1 and the main pixel electrode PA2. The sub-pixel electrode PB2 is located on the edge G2A of the gate line G2, and connects each of the other end portions of the main pixel electrode PA1 and the main pixel electrode PA2. The sub-pixel electrode PB3 is located substantially in the central portion of the pixel PX, i.e., the approximately middle portion between the sub-pixel electrode PB1 and the sub-pixel electrode PB2. Moreover, this sub-pixel electrode PB3 is located on the auxiliary capacitance line C1. The pixel electrode PE forms an 8-shape.

The switching element SW is formed in a region which overlaps with the source line S1 and the auxiliary capacitance line C1, and the drain electrode WD located on the auxiliary capacitance line C1 is electrically connected with the sub-pixel electrode PB3 through the contact hole CH.

It is possible to combine the counter substrate CT equipped with the common electrode CE shown in FIG. 3 with the array substrate AR equipped with the pixel electrode PE according to this embodiment. In this case, the main common electrode CAC which forms electric field with the pixel electrodes PE passes above the contact hole CH, and is located approximately in the middle portion between the main pixel electrode PA1 and the main pixel electrode PA2, for example.

In this embodiment, the same effect as the first embodiment is acquired. Furthermore, at the time of ON in which electric field is formed between the pixel electrode PE and the main common electrode CAC in one pixel PX, the main alignment directions of the liquid crystal molecule LM differ in four domains divided by the pixel electrode PE and the main common electrode CAC, and four domains are formed. Since the display is optically compensated by two of the four domains in the inclining visual-angle direction from the normal line, wider viewing angle is attained.

Figure 7:
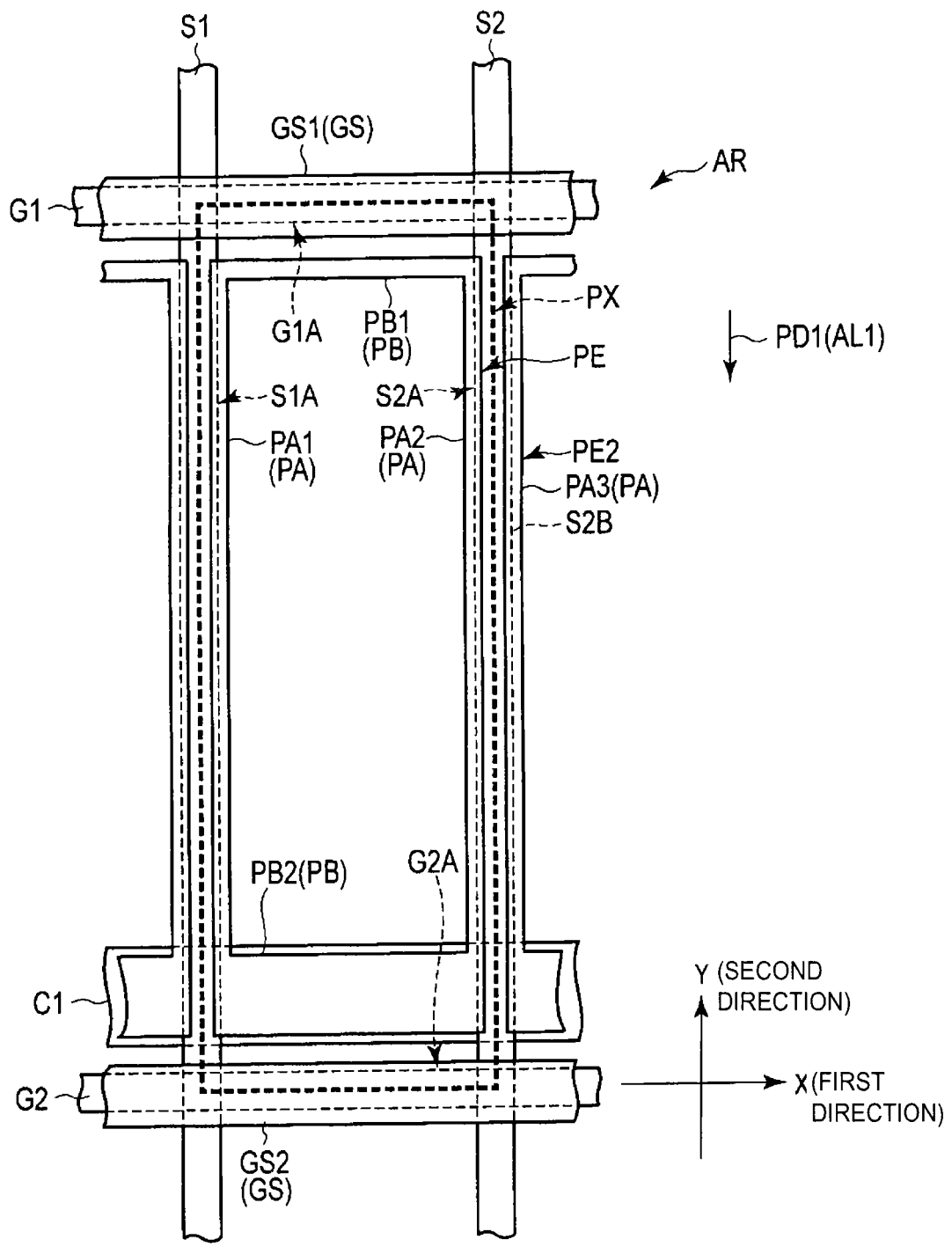
FIG. 7 is a plan view schematically showing the structure of one pixel in the array substrate shown in FIG. 1 when the array substrate is seen from the counter substrate side according to a third embodiment.

FIG. 7 is a plan view schematically showing the structure of one pixel in the array substrate shown in FIG. 1 when the array substrate is seen from the counter substrate side according to a third embodiment.

The third embodiment is different from the first embodiment shown in FIG. 2 in the point that the display includes the gate shield electrodes GS of the same potential as that of the common electrode CE which counter with the gate line G1 and the gate line G2, respectively.

In the pixel electrode PE, the main pixel electrode PA1, the main pixel electrode PA2, the sub-pixel electrode PB1, and the sub-pixel electrode PB2 are formed integrally or continuously, and they are electrically connected mutually. While the sub-pixel electrode PB1 is located on the upper side in the illustrated pixel PX, the sub-pixel electrode PB1 does not overlap with the gate line G1, and is located between the gate line G1 and the gate line G2. The sub-pixel electrode PB1 connects each of the end portions of the main pixel electrode PA1 and the main pixel electrode PA2. While the sub-pixel electrode PB2 is located on the bottom side in the illustrated pixel PX, the sub-pixel electrode PB2 does not overlap with the gate line G2, and is located between the gate line G1 and the gate line G2. The sub-pixel electrode PB2 connects each of the other end portions of the main pixel electrode PA1 and the main pixel electrode PA2. The sub-pixel electrode PB2 is located on the auxiliary capacitance line C1, and is electrically connected with the switching element. The pixel electrode PE forms a frame shape. In the pixel electrode PE, the sub-pixel electrode PB1 may be eliminated, and the pixel electrode PE may form a U shape.

The gate shield electrode GS is apart from the pixel electrode PE. A gate shield electrode GS1 is located on the gate line G1, and forms a gap between the gate shield electrode GS1 and the sub-pixel electrode PB1. That is, the gate shield electrode GS1 is located also on the edge G1A of the gate line G1. The gate shield electrode GS2 is located on the gate line G2, and forms a gap between the gate shield electrode GS2 and the sub-pixel electrode PB2. The gate shield electrode GS2 is located also on the edge G2A of the gate line G2. The gate shield electrode GS1 and the gate shield electrode GS2 linearly extend along the first direction X, respectively, and are formed in the shape of a belt. In addition, the width of the gate shield electrode GS in the second direction Y may not necessarily be the same. The gate shield electrode GS is electrically connected with the common electrode CE. Moreover, since the gate shield electrode GS is formed on the surface of the insulating film 13 which is the same layer as the pixel electrode PE, the gate shield electrode GS can be formed using the same materials (for example, ITO, etc.) as the pixel electrode PE.

When the array substrate AR is combined with the counter substrate CT shown in FIG. 3, the gate shield electrode GS1 counters with the sub-common electrode CBU, and the gate shield electrode GS2 counters with the sub-common electrode CBB.

According to this embodiment, since the gate shield electrode GS counters with the gate line G, it becomes possible to shield undesirable electric field from the gate line G regardless of the shape of the pixel electrode PE.

Figure 8:
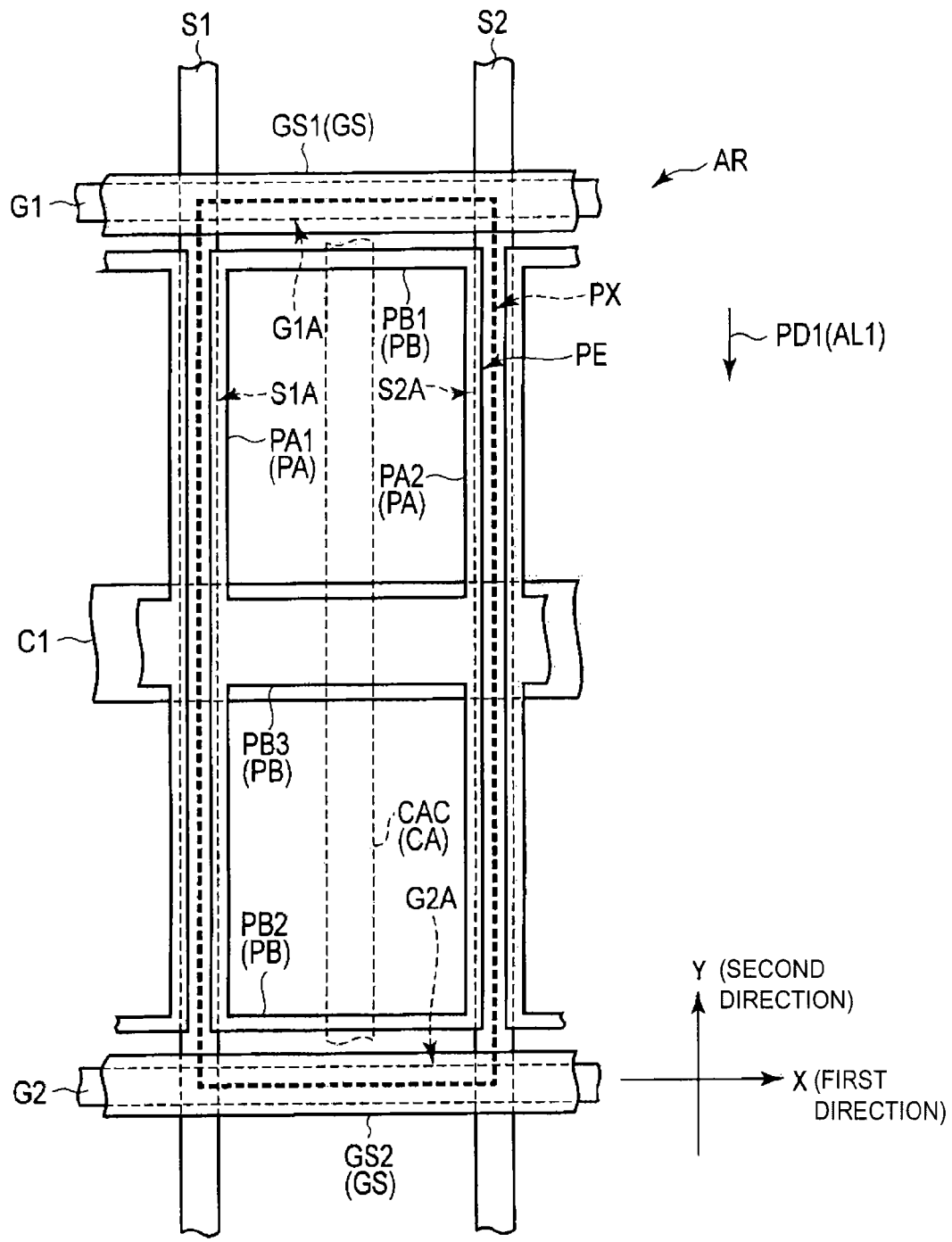
FIG. 8 is a plan view schematically showing the structure of one pixel in the array substrate shown in FIG. 1 when the array substrate is seen from the counter substrate side according to a fourth embodiment.

FIG. 8 is a plan view schematically showing the structure of one pixel in the array substrate shown in FIG. 1 when the array substrate is seen from the counter substrate side according to a fourth embodiment.

This embodiment is different from the second embodiment shown in FIG. 6 in that the display device includes gate shield electrodes GS of the same potential as that of the common electrode CE which counters with the gate line G1 and the gate line G2, respectively.

In the pixel electrode PE, the main pixel electrode PA1, the main pixel electrode PA2, the sub-pixel electrode PB1, the sub-pixel electrode PB2, and the sub-pixel electrode PB3 are formed integrally or continuously, and are electrically connected mutually. While the sub-pixel electrode PB1 is located on the upper side in the illustrated pixel PX, the sub-pixel electrode PB1 does not overlap with the gate line G1, and are located between the gate line G1 and the gate line G2. The sub-pixel electrode PB1 connects each of end portions of the main pixel electrode PA1 and the main pixel electrode PA2. While the sub-pixel electrode PB2 is located on the bottom side in the illustrated pixel PX, the sub-pixel electrode PB2 does not overlap with the gate line G2, and is located between the gate line G1 and the gate line G2. The sub-pixel electrode PB2 connects each of the other end portions of the main pixel electrode PA1 and the main pixel electrode PA2. The sub-pixel electrode PB3 is located on the auxiliary capacitance line C1, and electrically connected with the switching element. The pixel electrode PE forms the shape of an 8 character. In addition, in the pixel electrode PE, the sub-pixel electrode PB1 and the sub-pixel electrode PB2 may be eliminated, and the pixel electrode PE may form an H-shape.

The gate shield electrode GS is apart from the pixel electrode PE like the embodiment shown in FIG. 7. The gate shield electrode GS1 is located on the gate line G1, and forms a gap between the gate shield electrode GS1 and the sub-pixel electrode PB1. That is, the gate shield electrode GS1 is located also on the edge G1A of the gate line G1. The gate shield electrode GS2 is located on the gate line G2, and forms a gap between the gate shield electrode GS2 and the sub-pixel electrode PB2. This gate shield electrode GS2 is located also on the edge G2A of the gate line G2. The gate shield electrode GS is connected with the common electrode CE.

According to this embodiment, since the gate shield electrode GS counters with the gate line G, it becomes possible to shield undesirable electric field from the gate line G regardless of the shape of the pixel electrode PE.

While the structure in which two main pixel electrodes PA are arranged in one pixel electrode PE is explained in the above embodiments, the structure is not limited to the above one. The main common electrode CA indispensable to one pixel is located between the main pixel electrodes PA. For this reason, when the number of the main pixel electrodes PA with which one pixel electrode PE in one pixel is equipped is expressed with "a", the number of the main common electrodes CA in one pixel is expressed with (a−1), and one main common electrode CA is arranged between the adjoining main pixel electrodes PA (here, "a" is a positive number). In addition, if the number of the main common electrodes CA located above the source lines S in the both ends of each pixel PX is included, the number of the main common electrodes CA in one pixel is expressed with (a+1).

Figure 9:
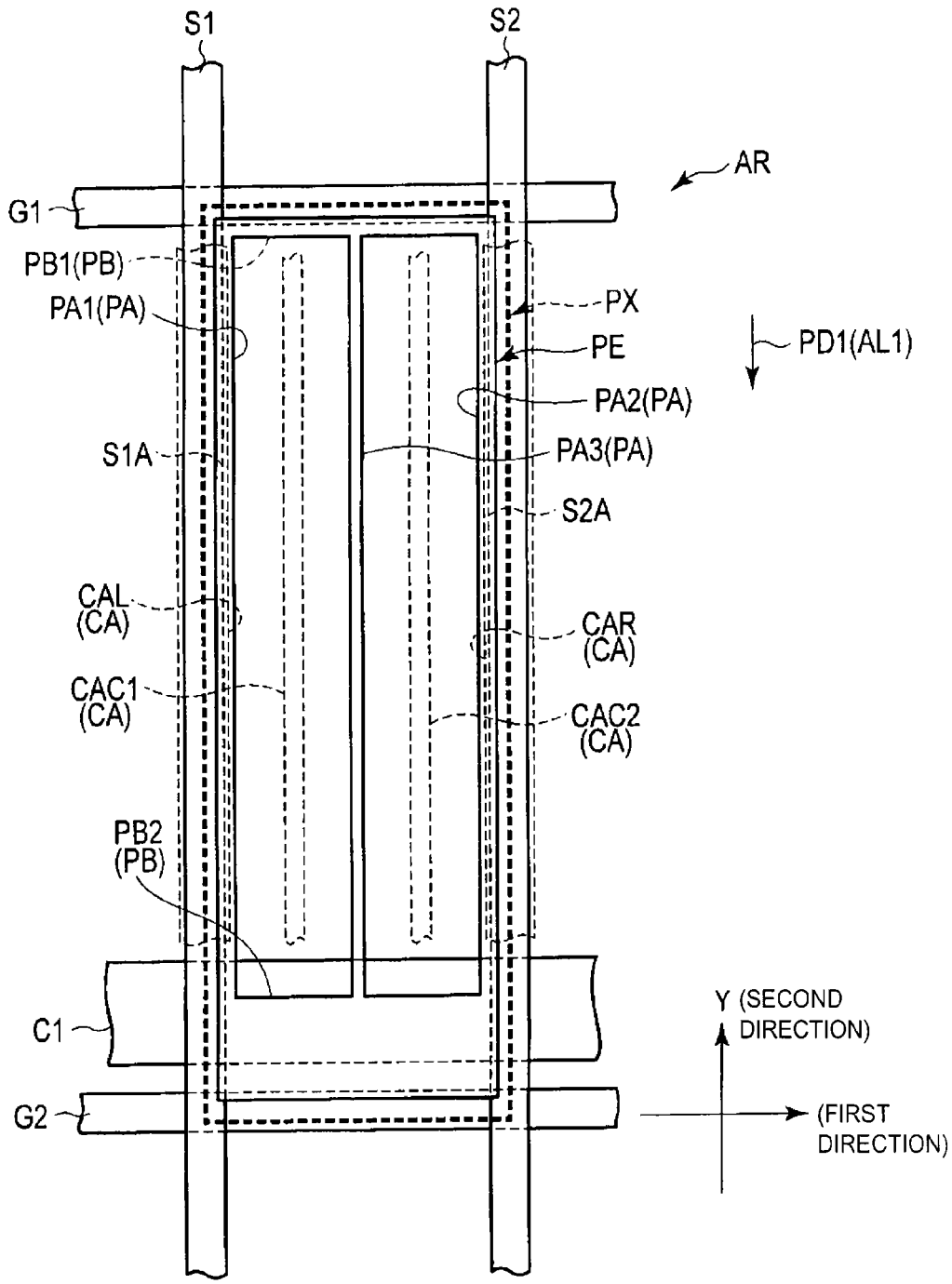
FIG. 9 is a plan view schematically showing the structure of one pixel in the array substrate shown in FIG. 1 when the array substrate is seen from the counter substrate side according to a fifth embodiment.

FIG. 9 is a plan view schematically showing the structure of one pixel in the array substrate shown in FIG. 1 when the array substrate is seen from the counter substrate side according to a fifth embodiment.

The pixel electrode PE shown herein is equipped with three main pixel electrodes PA. That is, the pixel electrode PE is equipped with the main pixel electrode PA1 located on the edge S1A of the source line S1, the main pixel electrode PA2 located on the edge S2A of the source line S2, and the main pixel electrode PA3 located in the approximately middle portion between the main pixel electrode PA1 and the main pixel electrode PA2. The distance between the main pixel electrode PA1 and the main pixel electrode PA3 in the first direction X is substantially the same as that between the main pixel electrode PA2 and the main pixel electrode PA3 These three main pixel electrodes PA are connected with the sub-pixel electrode PB.

In this embodiment, the number of the indispensable main common electrodes CA is two for the pixel electrode PE. That is, the main common electrode CAC1 is arranged between the main pixel electrode PA1 and the main pixel electrode PA3, and the main common electrode CAC2 is arranged between the main pixel electrode PA2 and the main pixel electrode PA3. In addition, when the main common electrode CAL above the source line S1 and the main common electrode CAR above the source line S2 are included, four main common electrodes CA are needed in one pixel PX.

In addition, it is also possible to apply the pixel electrode PE equipped with more than four main pixel electrodes PA. In this case, the number of the main common electrodes CA in one pixel is as above-mentioned.

As explained above, according to the embodiments, it becomes possible to supply the liquid crystal display device which can control degradation of display grace.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device, comprising:
    a first substrate including;
        a first gate line and a second gate line extending in a first direction, respectively,
        an auxiliary capacitance line arranged between the first gate line and the second gate line and extending in the first direction,
        a first source line and a second source line extending in a second direction orthogonally crossing the first direction,
        a switching element connected with the first gate line and the first source line,
        a pixel electrode having a first main pixel electrode in the shape of a belt located on an edge of the first source line and extending in the second direction, a second main pixel electrode in the shape of a belt located on an edge of the second source line and extending in the second direction, and a first sub-pixel electrode located on the auxiliary capacitance line and connected with the switching element, wherein the first sub-pixel electrode is formed in the shape of a belt, connects the first main pixel electrode with the second main pixel electrode, and extends in the first direction,
    a second substrate including;
        a first main common electrode located between the first main pixel electrode and the second main pixel electrode and extending in the second direction,
        a second main common electrode arranged above the first source line and extending in the second direction, and
        a third main common electrode arranged on the second source line and extending in the second direction,
    a liquid crystal layer held between the first substrate and the second substrate having liquid crystal molecules.

2. The liquid crystal display device according to claim 1, wherein the first sub-pixel electrode is arranged on an edge of the first gate line.

3. The liquid crystal display device according to claim 1, wherein the pixel electrode includes a second sub-pixel electrode located on an edge of the second gate line, connecting the first main pixel electrode with the second main pixel electrode, and extending in the first direction.

4. The liquid crystal display device according to claim 1, wherein the pixel electrode includes;
    a second sub-pixel electrode located on an edge of the first gate line, connecting the first main pixel electrode with the second pixel electrode, and extending in the first direction, and
    a third sub-pixel electrode located on an edge of the second gate line, connecting the first main pixel electrode with the second pixel electrode, and extending in the first direction.

5. A liquid crystal display device, comprising:
a first substrate including;
- a first gate line and a second gate line extending in a first direction, respectively,
- a first source line and a second source line extending in a second direction orthogonally crossing the first direction, and
- a pixel electrode having a first main pixel electrode in the shape of a belt located on an edge of the first source line and extending in the second direction, and a second main pixel electrode in the shape of a belt located on an edge of the second source line and extending in the second direction,
a second substrate including a first main common electrode located between the first main pixel electrode and the second main pixel electrode and extending in the second direction, and
a liquid crystal layer held between the first substrate and the second substrate having liquid crystal molecules;
wherein the pixel electrode includes;
- a first sub-pixel electrode located on an edge of the first gate line, connecting the first main pixel electrode with the second main pixel electrode and extending in the first direction, and
- a second sub-pixel electrode located on an edge of the second gate line, connecting the first main pixel electrode with the second main pixel electrode and extending in the first direction;
wherein the first substrate includes an auxiliary capacitance line arranged between the first gate line and the second gate line and extending in the first direction, and a switching element connected with the first gate line and the first source line, and
the first sub-pixel electrode is located striding over the first gate line and the auxiliary capacitance line, and connected with the switching element.

6. The liquid crystal display device according to claim 5, wherein
the first substrate includes gate shield electrodes facing the first and second gate lines, respectively, and set to the same potential as the first common electrode.

7. The liquid crystal display device according to claim 6, wherein
the pixel electrode includes a sub-pixel electrode in the shape of a belt located between the first gate line and the second gate line, connecting the first main pixel electrode with the second main pixel electrode, and extending in the first direction.

8. The liquid crystal display device according to claim 7, wherein
the first substrate includes an auxiliary capacitance line arranged between the first gate line and the second gate line and extending in the first direction, and a switching element connected with the first gate line and the first source line, and
the sub-pixel electrode is located on the auxiliary capacitance line and connected with the switching element.

9. The liquid crystal display device according to claim 5, wherein the second substrate includes a second main common electrode in the shape of a belt located above the first source line and extending in the second direction, and a third main common electrode in the shape of a belt above the second source line and extending in the second direction.

10. The liquid crystal display device according to claim 5, wherein an initial alignment direction of the liquid crystal molecule of the liquid crystal layer is in parallel with the second direction in a state where electric field is not formed between the pixel electrode and the first main common electrode.

11. The liquid crystal display device according to claim 5, wherein the liquid crystal molecule is driven by a lateral electric field or a slightly oblique electric field with respect to the first and second substrates.

12. A liquid crystal display device comprising:
a first substrate including;
- a first gate line and a second gate line extending in a first direction, respectively,
- a first source line and a second source line extending in a second direction orthogonally crossing the first direction, and
- a pixel electrode having a first main pixel electrode in the shape of a belt located on an edge of the first source line and extending in the second direction, and a second main pixel electrode in the shape of a belt located on an edge of the second source line and extending in the second direction,
a second substrate including a first main common electrode located between the first main pixel electrode and the second main pixel electrode and extending in the second direction, and
a liquid crystal layer held between the first substrate and the second substrate having liquid crystal molecules,
wherein the pixel electrode includes;
- a first sub-pixel electrode located on an edge of the first gate line, connecting the first main pixel electrode with the second main pixel electrode and extending in the first direction, and
- a second sub-pixel electrode located on an edge of the second gate line, connecting the first main pixel electrode with the second main pixel electrode and extending in the first direction, and
- a third sub-pixel electrode located between the first sub-pixel electrode and the second sub-pixel electrode, connecting the first main pixel electrode with the second main pixel electrode, and extending in the first direction.

13. The liquid crystal display device according to claim 12, wherein
the first substrate includes an auxiliary capacitance line arranged substantially in the central portion between the first gate line and the second gate line and extending in the first direction, and a switching element connected with the first gate line and the first source line, and
the third sub-pixel electrode is located on the auxiliary capacitance line and connected with the switching element.

14. A liquid crystal display device comprising:
a first substrate including;
- a first gate line and a second gate line extending in a first direction, respectively,
- a first source line and a second source line extending in a second direction orthogonally crossing the first direction, and
- a pixel electrode having a first main pixel electrode in the shape of a belt located on an edge of the first source line and extending in the second direction, and a second main pixel electrode in the shape of a belt located on an edge of the second source line and extending in the second direction,
a second substrate including a first main common electrode located between the first main pixel electrode and the second main pixel electrode and extending in the second direction, and a liquid crystal layer held between the first substrate and the second substrate having liquid crystal molecules, wherein the second substrate includes a second main common electrode in the shape of a belt located above the first source line and extending in the second direction, and a third main common electrode in the shape of a belt above the second source line and extending in the second direction, wherein the second substrate includes a first sub-common electrode in the shape of a belt located above the first gate line and extending in the first direction, and a second sub-common electrode in the shape of a belt located above the second gate line and extending in the first direction.

\* \* \* \* \*